US010951472B2

(12) United States Patent
Kondo et al.

(10) Patent No.: US 10,951,472 B2
(45) Date of Patent: Mar. 16, 2021

(54) INFORMATION PROCESSING DEVICE AND INFORMATION PROCESSING SYSTEM

(71) Applicant: FUJITSU LIMITED, Kawasaki (JP)

(72) Inventors: Takeshi Kondo, Yokohama (JP);
Daisuke Butsuda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 26 days.

(21) Appl. No.: 16/108,795

(22) Filed: Aug. 22, 2018

(65) Prior Publication Data
US 2019/0068442 A1    Feb. 28, 2019

(30) Foreign Application Priority Data

Aug. 25, 2017 (JP) .............................. JP2017-162094

(51) Int. Cl.
*H04L 12/24* (2006.01)
*G06F 9/455* (2018.01)

(52) U.S. Cl.
CPC ...... *H04L 41/0813* (2013.01); *G06F 9/45558* (2013.01); *H04L 41/0879* (2013.01); *H04L 41/5003* (2013.01); *G06F 2009/45562* (2013.01)

(58) Field of Classification Search
CPC ............. H04L 41/0813; H04L 41/0879; H04L 41/5003; G06F 9/45558; G06F 2009/45562
See application file for complete search history.

(56) References Cited

U.S. PATENT DOCUMENTS

| 8,560,368 B1* | 10/2013 | Maity ................... G06Q 10/20 705/7.13 |
| 9,703,544 B1* | 7/2017 | Feeser ....................... G06F 8/61 |
| 2011/0161491 A1* | 6/2011 | Sekiguchi ............. G06F 9/4856 709/224 |
| 2012/0195187 A1 | 8/2012 | Ashihara et al. |
| 2012/0210311 A1* | 8/2012 | Kikuchi ................... G06F 8/65 717/168 |
| 2014/0068613 A1* | 3/2014 | Iriguchi .................. G06F 8/656 718/1 |

(Continued)

FOREIGN PATENT DOCUMENTS

| JP | 2011-081588 | 4/2011 |
| JP | 2012-243157 | 12/2012 |

(Continued)

*Primary Examiner* — Nicholas R Taylor
*Assistant Examiner* — Sanjoy Roy
(74) *Attorney, Agent, or Firm* — Fujitsu Patent Center

(57) ABSTRACT

An information processing device includes a memory and a processor coupled to the memory. The processor is configured to record, in the memory, requests to a plurality of computers. The processor is configured to determine, based on a past trend of requests and a specified maintenance-performing time, a time period in which maintenance is to be performed. The processor is configured to stand by until the determined time period comes. The processor is configured to determine, after standby, a maintenance standby time for each of the plurality of computers based on requests assigned to each of the plurality of computers. The processor is configured to determine, based on the maintenance standby time determined for each of the plurality of computers, an order in which maintenance is performed on the plurality of computers.

10 Claims, 7 Drawing Sheets

(56) References Cited

U.S. PATENT DOCUMENTS

| | | | |
|---|---|---|---|
| 2014/0207920 A1* | 7/2014 | Hirana | H04L 41/0803 709/220 |
| 2015/0212808 A1* | 7/2015 | Mandava | G06F 8/65 717/168 |
| 2016/0299787 A1* | 10/2016 | Hayakawa | G06Q 10/06312 |

FOREIGN PATENT DOCUMENTS

| | | |
|---|---|---|
| JP | 2014-067402 | 4/2014 |
| JP | 2014-142678 | 8/2014 |

\* cited by examiner

INFORMATION PROCESSING DEVICE AND INFORMATION PROCESSING SYSTEM

CROSS-REFERENCE TO RELATED APPLICATION

This application is based upon and claims the benefit of priority of the prior Japanese Patent Application No. 2017-162094, filed on Aug. 25, 2017, the entire contents of which are incorporated herein by reference.

FIELD

The embodiment discussed herein is related to an information processing device and an information processing system.

BACKGROUND

When maintenance is performed on a virtual machine (which will be hereinafter referred to as a "VM"), which is executed in a server device or the like that forms a cloud service, a technique called immutable infrastructure is employed in which a so-called VM re-creation is performed each time. Also, a technique called blue/green deployment is employed in which a VM in the same environment is prepared in advance and replacement is performed. "Maintenance" as used herein refers to a maintenance work, such as "re-creation of a VM", "deletion of a VM", or the like.

Related techniques are disclosed in, for example, Japanese Laid-open Patent Publication No. 2012-243157, Japanese Laid-open Patent Publication No. 2014-142678, and Japanese Laid-open Patent Publication No. 2014-67402.

In the above-described known techniques for maintenance of VM, it is preferable to abundantly prepare Internet protocol (IP) addresses and server resources. Therefore, use of the known techniques is restricted in a situation in which resources are limited.

Also, in a case where a maintenance target VM is chosen without any special consideration, a time during which a service in a VM that is not chosen is maintained is increased in the following cases.

A case in which a VM that is performing time consuming processing is chosen.

A case in which performance of a VM that is not chosen is remarkably deteriorated.

A case in which a current trend is different from a normal trend and, for example, large amount of requests are expected.

As a result, there is a probability that it will be difficult to ensure a value of service guarantee for user or that a system down will be caused.

SUMMARY

According to an aspect of the present invention, provided is an information processing device including a memory and a processor coupled to the memory. The processor is configured to record, in the memory, requests to a plurality of computers. The processor is configured to determine, based on a past trend of requests and a specified maintenance-performing time, a time period in which maintenance is to be performed. The processor is configured to stand by until the determined time period comes. The processor is configured to determine, after standby, a maintenance standby time for each of the plurality of computers based on requests assigned to each of the plurality of computers. The processor is configured to determine, based on the maintenance standby time determined for each of the plurality of computers, an order in which maintenance is performed on the plurality of computers.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1:
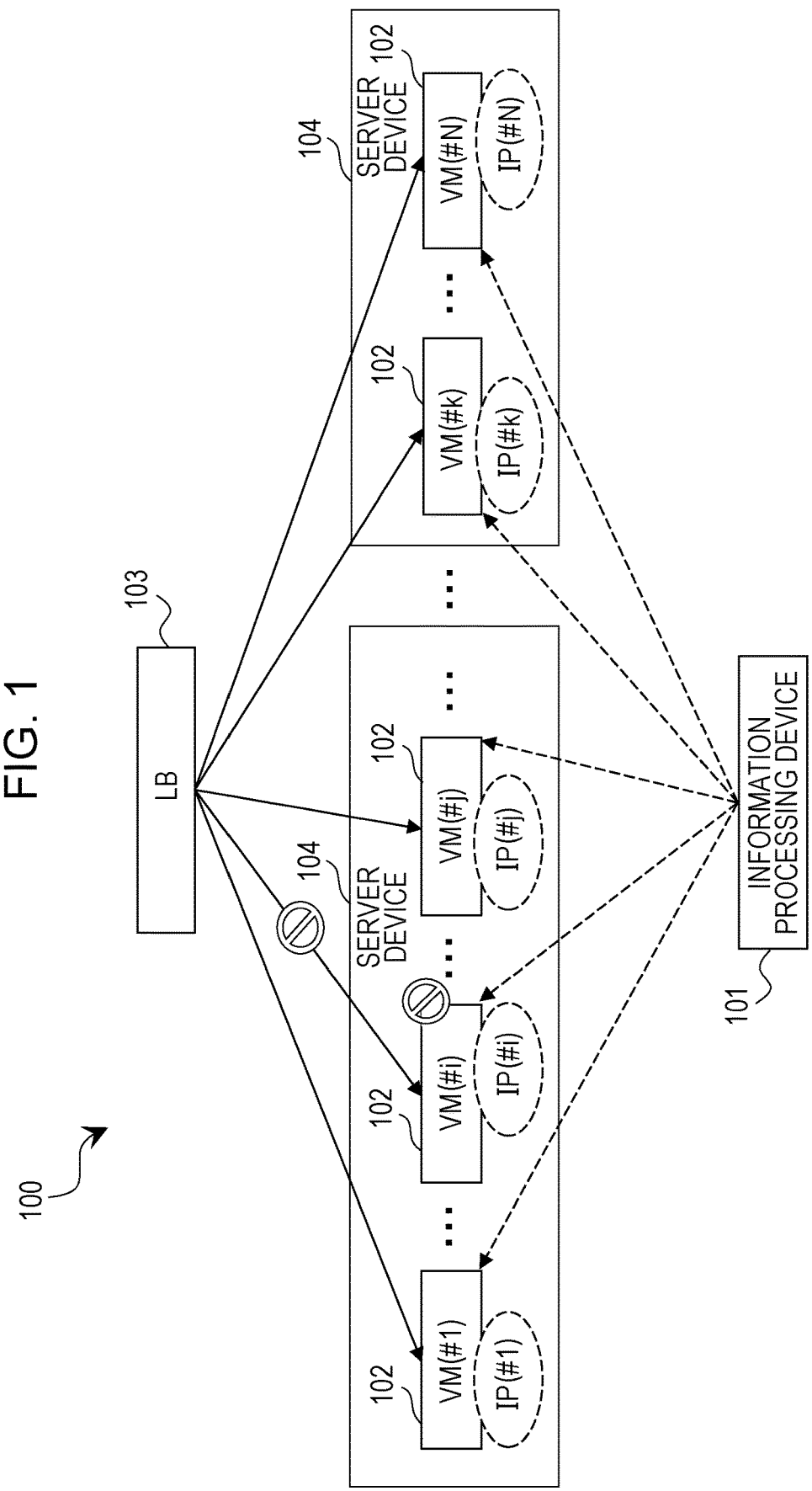
FIG. 1 is a diagram illustrating an exemplary cloud system to which an information processing device according to an embodiment is applied.

An embodiment of the present disclosure will be described in detail with reference to the accompanying drawings. FIG. 1 is a diagram illustrating an exemplary cloud system to which an information processing device according to the embodiment is applied. A cloud system 100 includes N (N is an integer of 1 or more) VMs 102 of #1 to #N, which are executed on one or more server devices (computers) 104. Also, the cloud system 100 includes a load balancer (which will be hereinafter referred to as "LB") 103 that distributes respective accesses from the outside to one of the N VMs 102. Furthermore, the cloud system 100 includes an information processing device 101 that performs maintenance on the N VMs 102.

Figure 2:
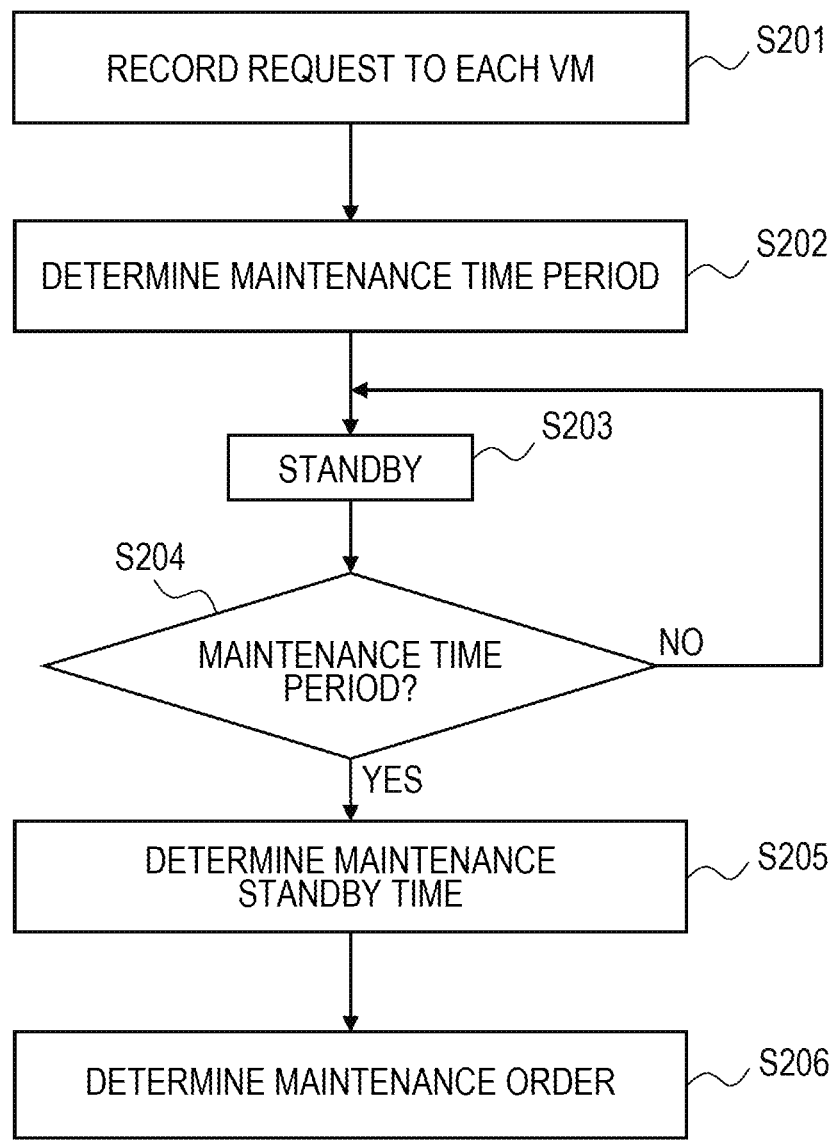
FIG. 2 is a flowchart illustrating an exemplary processing of a processor included in an information processing device according to an embodiment.
Figure 7:
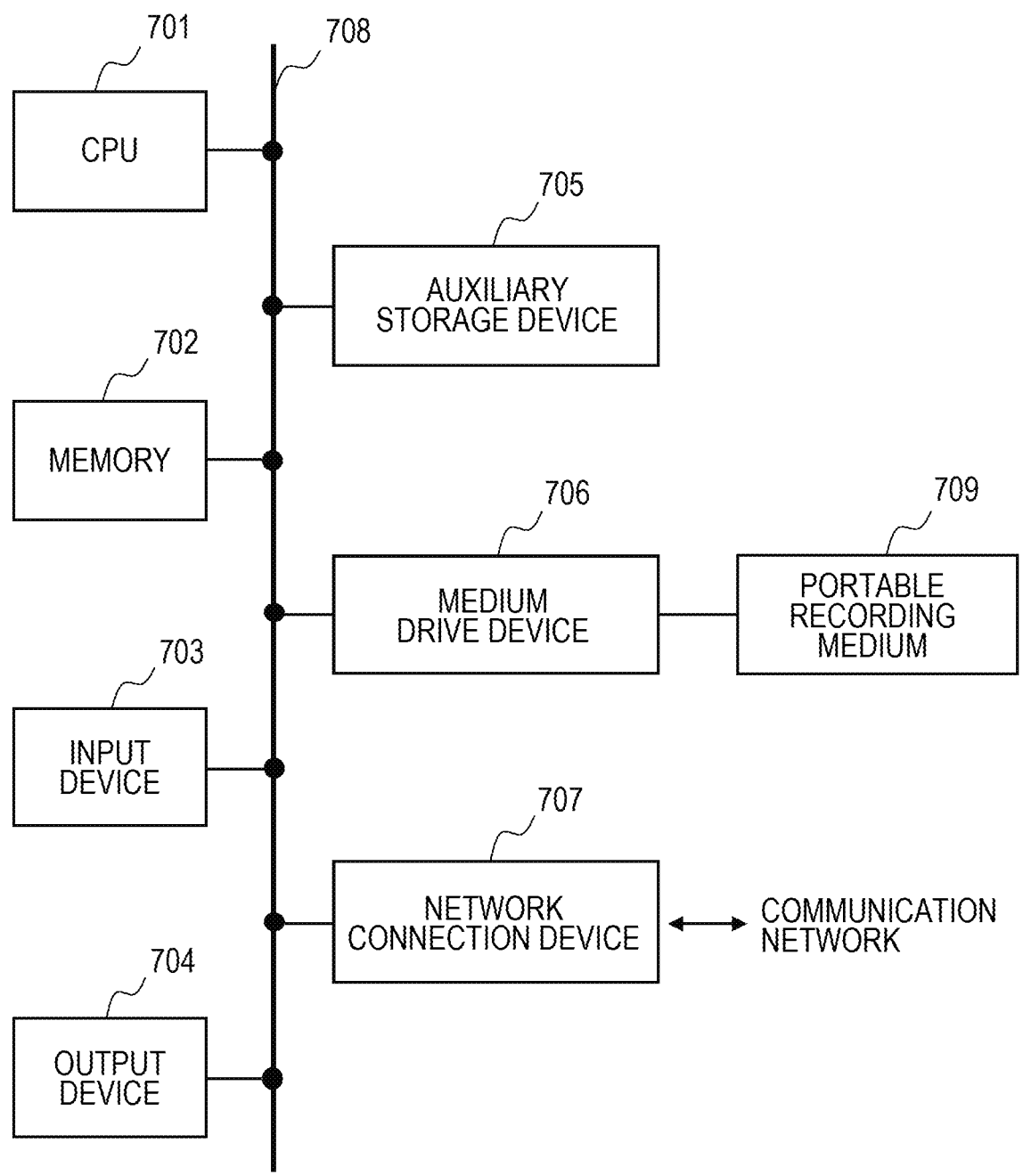
FIG. 7 is a diagram illustrating an exemplary hardware configuration of a computer that is able to implement an information processing device according to an embodiment.

The information processing device 101 includes a processor (for example, a central processing unit (CPU) 701 illustrated in FIG. 7) that controls the plurality of VMs 102 illustrated in FIG. 1. FIG. 2 is a flowchart illustrating an exemplary processing of the processor.

The processor records a request to each of the VMs 102 of #1 to #N illustrated in FIG. 1 (S201).

Next, the processor determines, based on a past request trend and a specified maintenance-performing time, a maintenance time period in which maintenance is to be performed (S202).

The processor stands by until the determined maintenance time period comes (repetition of S203→S204→S203). The "maintenance time period" may be a time period in which the number of requests that have been processed in the entire cloud system 100 illustrated in FIG. 1 is smaller among time periods in a day, and therefore suitable for performing maintenance.

After the above-described standby (YES in S204), the processor determines maintenance-standby time for each candidate VM 102 for maintenance (S205). The "maintenance-standby time" is a standby time to be spent from a time when a start instruction for maintenance processing is issued to a time when the maintenance processing is started for the maintenance target VM 102. The maintenance-standby time is determined based on a current processing state. The processor determines the maintenance-standby time for a VM 102, for example, based on the request types and the numbers of requests of the respective request types with regard to the VM 102 and request processing performance determined by processing speed and a load. In a case where a start of maintenance processing is instructed for a maintenance target VM 102, the VM 102 is disconnected by the LB 103 illustrated in FIG. 1. After execution of a request that is currently being processed at that time point is completed, maintenance processing on the VM 102 is started. After it is determined that the maintenance time period has come, the processor determines, for each maintenance target VM 102, a maintenance-standby time that is a standby time to be spent from a time when a start instruction for maintenance processing is issued to a time when the maintenance processing is started.

In a case where maintenance is executed in the determined maintenance time period, the processor determines an order in which maintenance is executed on the candidate VMs 102 for maintenance in ascending order of the determined maintenance-standby time (S206). In a case where maintenance processing is started with a VM 102 having a shorter maintenance-standby time, which is a standby time to be spent from a time when a start instruction for maintenance processing is issued to a time when the maintenance processing is started, a time which it takes for an old VM 102 to be released and replaced with a new VM 102 is shorter, and the entire device is less affected. Therefore, according to the embodiment, maintenance processing is executed in ascending order of the maintenance-standby time.

In the above-described configuration, for example, if an upper limit value of service guarantee is set for the VM 102, the processor determines the maintenance time period in consideration of the upper limit value of service guarantee. More specifically, for example, in a case where a current request trend follows the past request trend and the number of current requests is larger than the number of requests in the past request trend, the processor gives an administrator of the VM 102 a warning in consideration of the upper limit value of service guarantee and allows the administrator to choose whether to perform or postpone maintenance. In a case where the administrator chooses to perform maintenance, the processor starts maintenance processing, for example, after standing by until the determined maintenance time period comes. In a case where the administrator chooses not to perform maintenance, the processor, for example, postpones execution of maintenance, for example, until the following day or after.

Also, for example, in a case where the current request trend follows the past request trend and the number of current requests is smaller than the number of requests in the past request trend, the processor allows the administrator to choose whether or not to immediately perform maintenance. In a case where the administrator chooses to immediately perform maintenance, the processor starts maintenance processing, for example, without performing the above-described standby. Also, in a case where the administrator chooses not to immediately perform maintenance, the processor causes maintenance processing to be started after standing by, for example, until the determined maintenance time period comes.

In a case where the current request trend follows the past request trend and the number of current requests is average with respect to the number of requests in the past request trend, the processor starts maintenance processing after standing by until the determined maintenance time period comes.

On the other hand, for example, in a case where the current request trend is peculiar such that the current request trend does not follow the past request trend, the processor gives the administrator a warning and allows the administrator to choose whether to perform or postpone maintenance. In a case where the administrator chooses to perform maintenance, the processor starts maintenance processing, for example, without performing the above-described standby. In a case where the administrator chooses not to perform maintenance, for example, the processor postpones execution of maintenance, for example, until the following day or after.

According to the embodiment, by the operations of maintenance control described above, on a steady basis in advance of execution of maintenance, the processor first determines, based on the past request trend and the specified maintenance-performing time, a rough maintenance time period for each VM 102, and stands by until the determined maintenance time period comes. Then, the processor determines an order of performing maintenance on the candidate VMs 102 in ascending order of the maintenance-standby time for each VM 102, which is determined based on the request types and the numbers of requests of the respective request types with regard to each VM 102 and request processing performance. With the above-described control, according to the embodiment, it is possible to avoid a situation in which a VM 102 having long maintenance-standby time is chosen for maintenance, in which performance of a VM 102 that is not chosen for maintenance is remarkably deteriorated, or the like. More specifically, according to the embodiment, in a case where the number of requests is relatively large and the upper limit value of service guarantee is set, a warning is given in consideration of the upper limit value of service guarantee and the administrator is allowed to choose whether to perform or postpone maintenance. In a case where the number of requests is relatively small, the administrator is allowed to choose to immediately perform maintenance without performing standby based on the past trend. In a case where a peculiar trend which is different from the past trend is detected in which, for example, a very large number of requests are expected, the administrator is allowed to choose whether to perform or postpone maintenance. According to the embodiment, it is possible to reduce a probability that it becomes difficult to ensure the value of service guarantee for the user or a system down is caused, which may be caused in a case where a time is increased during which a service is maintained in a VM 102 that is not chosen.

Therefore, according to the embodiment, an advantage of minimizing a time in which an excessive server resource, such as a newly created server resource or the like, exists and an advantage of minimizing a single system processing time in which, for example, a single system processing is performed by a VM that is not chosen as a maintenance target may be achieved. Furthermore, an advantage of proposing date and time suitable for maintenance may be achieved.

Figure 3:
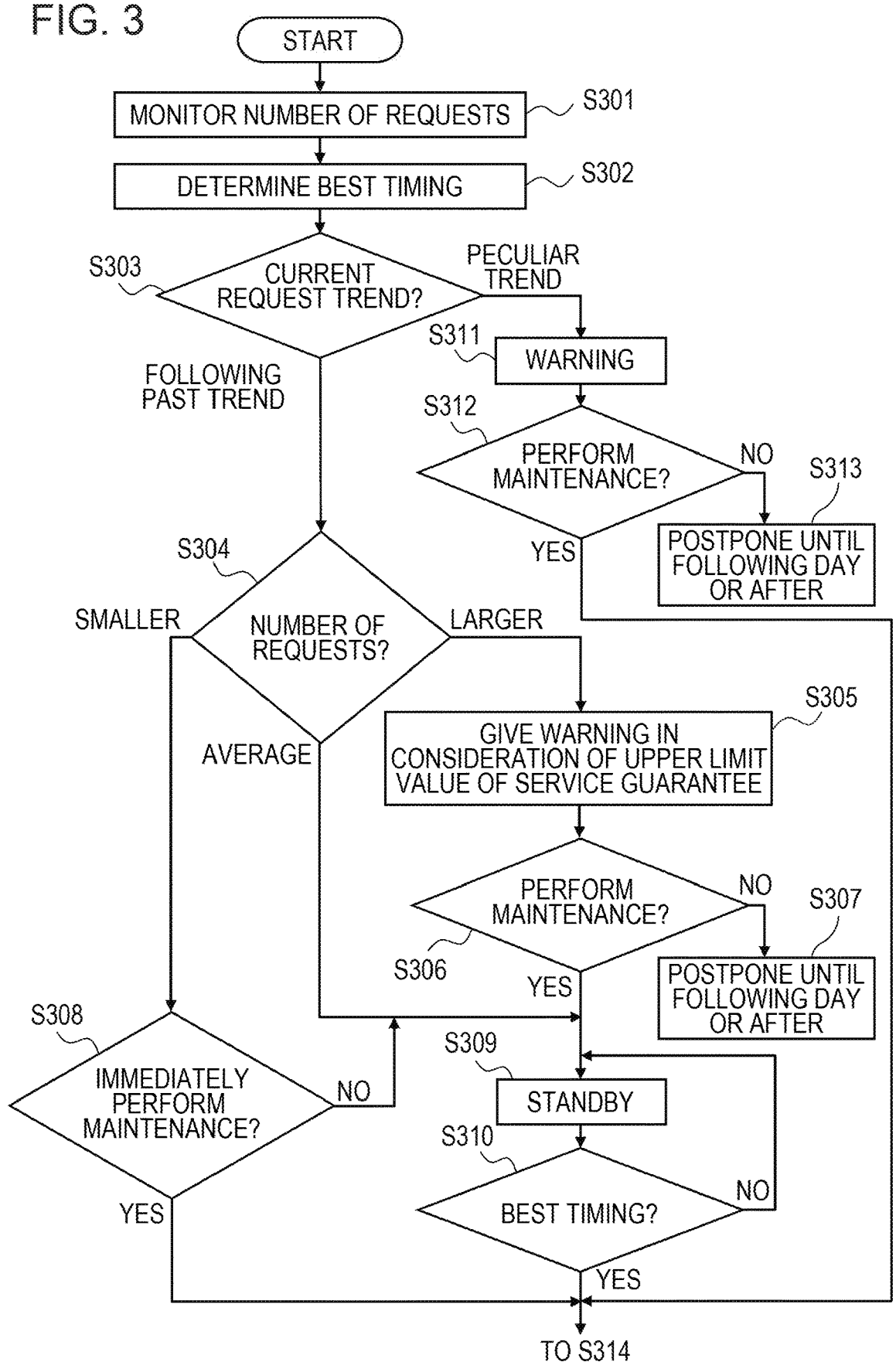
FIG. 3 is a flowchart illustrating an exemplary maintenance control processing.
Figure 4:
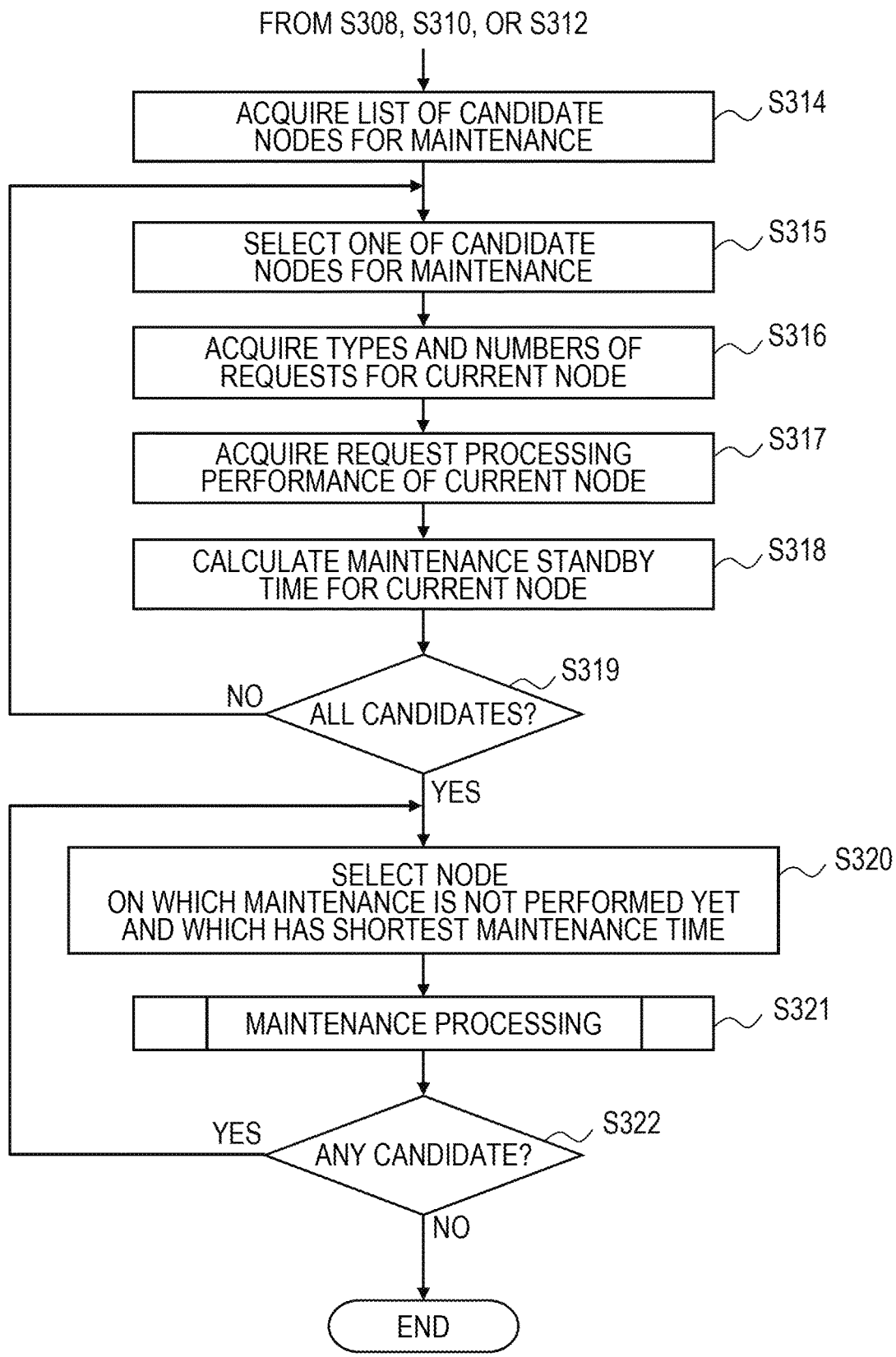
FIG. 4 is a flowchart illustrating an exemplary maintenance control processing.

FIG. 3 and FIG. 4 are flowcharts illustrating an exemplary maintenance control processing. First, the information processing device 101 illustrated in FIG. 1 monitors the number of requests to each of the VMs 102 of #1 to #N (S301). For example, looking at a virtual machine service as an example, the information processing device 101 monitors the number of requests via an application programming interface (API), for example, in a manner described below. Note that, in reality, this monitoring is performed at all times, and therefore, how a statistic is calculated (every hour, every minute, or the like) does not matter.

10 o'clock to 11 o'clock 100 API requests/hour
11 o'clock to 12 o'clock 120 API requests/hour
12 o'clock to 13 o'clock 90 API requests/hour Next, the processor included in the information processing device 101 determines a preferred timing at which maintenance is performed, based on a past trend and a specified maintenance-performing time (S302). This determination is, for example, determination that "the number of requests per hour is the smallest on Sunday mornings" or the like. Specifically, for example, in a case where "a time period at night" is specified as the maintenance-performing time by the administrator of maintenance, the processor refers to, for example, the numbers of requests per hour, which have been monitored in the past, and determines a time period having the smallest number of requests among time periods at night, as the preferred timing.

Subsequently, the processor determines whether a request trend on the current day (substantially) follows the past request trend or is a peculiar trend (does not follow the past request trend) (S303).

In a case where the processor determines that the request trend on the current day follows the past request trend (FOLLOWING PAST TREND in S303), the processor further compares the number of requests on the current day with the number of requests in the past request trend and determines whether the number of requests is smaller or larger (S304).

In a case where the processor determines that the number of requests on the current day is larger (LARGER in S304), the processor gives a warning on a display in consideration of the upper limit value of service guarantee (704 in FIG. 7, which will be described later, or the like) of the information processing device 101 (S305). For example, numerical values indicated below are set as the upper limit value of service guarantee, and it is displayed, as the warning, that these guarantee values are not satisfied.

A response is returned within one minute.
Response success rate is 99.999999% or more.
300 multiplex API processing per one minute is guaranteed.

Thereafter, the processor chooses whether or not maintenance is to be performed, in accordance with an instruction of the user (S306).

In a case where the processor chooses to perform maintenance (YES in S306), the processor stands by until the preferred timing that is determined in S302 comes (repetition processing of S309→S310→S309). Thereafter (YES in S310), the processor causes the process to proceed to S314 in FIG. 4.

In a case where the processor chooses not to perform maintenance (NO in S306), the processor postpones execution of maintenance, for example, to the following day or after (S307).

In a case where the processor determines that the number of requests on the current day is smaller (SMALLER in S304), the processor chooses whether or not maintenance is to be immediately performed, in accordance with an instruction of the user (S308).

In a case where the processor chooses to immediately perform maintenance (YES in S308), the processor causes the process to proceed to S314 in FIG. 4.

In a case where the processor chooses not to immediately perform maintenance (NO in S308), the processor stands by until the preferred timing that is determined in S302 comes (repetition processing of S309→S310→S309). Thereafter (YES in S310), the processor causes the process to proceed to S314 in FIG. 4.

In a case where the processor determines that the number of requests on the current day is average (AVERAGE in S304), the processor stands by until the preferred timing that is determined in S302 comes (repetition processing of S309→S310→S309). Thereafter (YES in S310), the processor causes the process to proceed to S314 in FIG. 4.

In a case where the processor determines that the current request trend is a peculiar trend that does not follow the past request trend (PECULIAR TREND in S303), the processor gives a warning on the display of the information processing device 101 (S311). Thereafter, the processor chooses whether or not maintenance is to be performed, in accordance with an instruction of the user (S312).

In a case where the processor chooses to perform maintenance (YES in S312), the processor causes the process to proceed to S314 in FIG. 4.

In a case where the processor chooses not to perform maintenance (NO in S312), the processor postpones execution of maintenance, for example, until the following day or after (S313).

Figure 5:
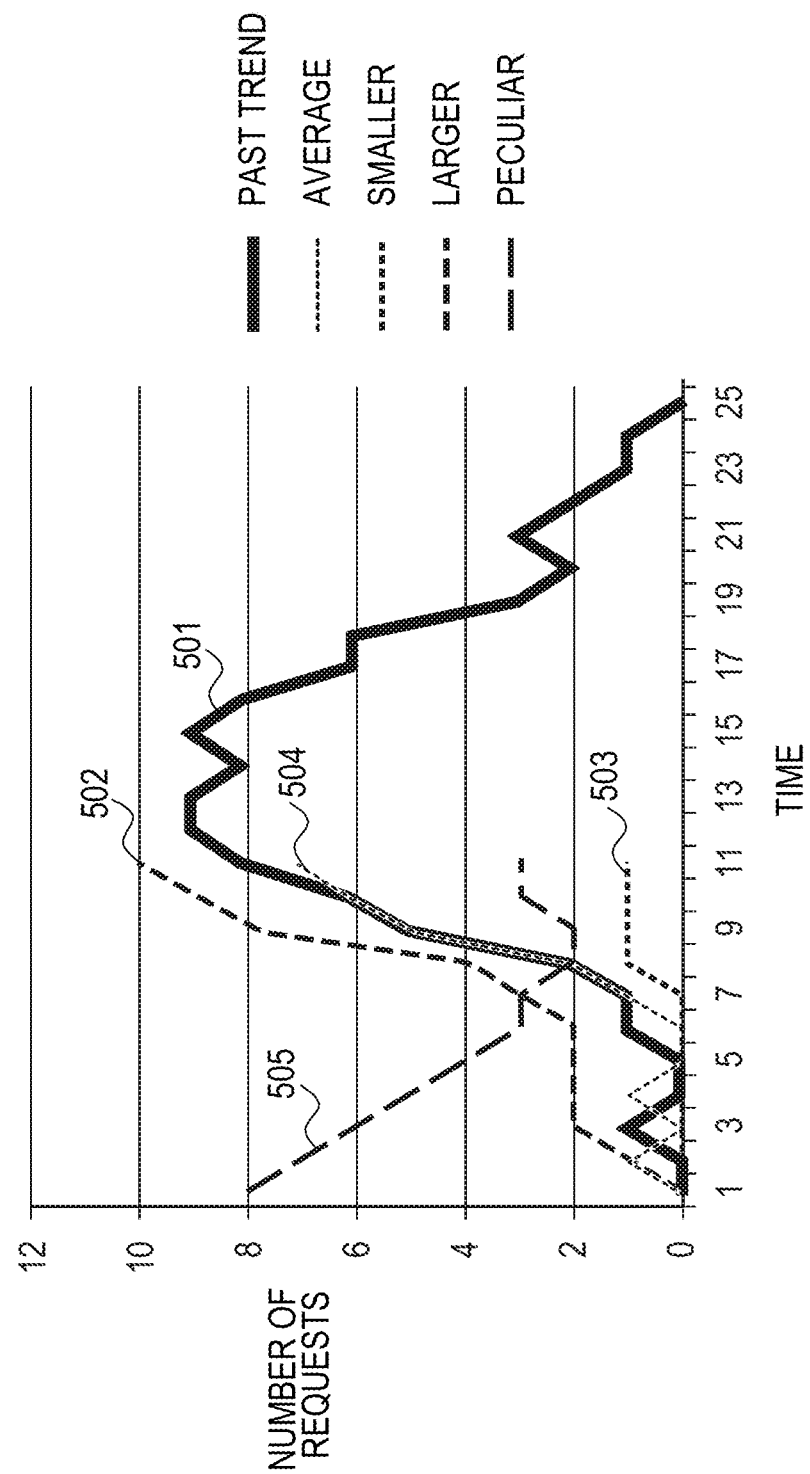
FIG. 5 is a diagram illustrating comparison between request trends.

FIG. 5 is a diagram illustrating comparison between request trends. The horizontal axis indicates an elapsed time and the vertical axis indicates the number of requests. Now, assume that the current time is, for example, 11 o'clock. Assuming that the past request trend is the behavior indicated by a solid line 501, in a case where the current request trend at 11 o'clock is, for example, the behavior indicated by a loosely dashed line 502, the current request trend follows the past request trend and it is determined that the number of requests is larger. Also, in a case where the current request trend at 11 o'clock is, for example, the behavior indicated by a dashed line 503, the current request trend follows the past request trend and it is determined that the number of requests is smaller. Furthermore, in a case where the current request trend at 11 o'clock is, for example, the behavior indicated by a dotted line 504, the current request trend follows the past request trend and it is determined that the number of requests is average. On the other hand, in a case where the current request trend at 11 o'clock is, for example, the behavior indicated by a long-dashed line 505, it is determined that the current request trend does not follow the past request trend and is a peculiar trend. The determination illustrated in FIG. 5 may be made by calculating a difference for every same hour, for example, between the behavior of the number of requests within a time period till the current time from one day before and the behavior of the number of requests within the same time period in the past, calculating an average value and a standard deviation or the like, and thereby, evaluating the values thereof.

Following the control illustrated in FIG. 3, the processor included in the information processing device 101 illustrated in FIG. 1 executes control processing from S314 to S319 in FIG. 4.

The processor first acquires a list of candidate nodes (=VMs 102) for maintenance among the VMs 102 of #1 to #N illustrated in FIG. 1 (S314).

Next in S315, while the processor chooses, one by one, a candidate node on which maintenance is to be performed from the node list acquired in S314, the processor executes a series of processes from S316 to S318 until it is determined in S319 that processing for all of the candidate nodes is completed.

In the series of processes, the processor first acquires request types and the numbers of requests of the respective request types with regard to a node (=VM 102) which is currently chosen (S316). As the request types, for example, there are the following types.

GET-server: acquisition of a list of VMs 102
POST-server: creation of VM 102
DELETE-server: deletion of VM 102
PUT-server: modification of VM 102
POST-os-actions: migration of VM 102 (migration)
POST-os-actions: migration of VM 102 (live migration)
POST-os-actions: migration of VM 102 (resize)

Next, the processor acquires a request processing performance of the node (=VM 102) which is currently chosen (S317). As the request processing performance, for example, a request processing time from a time when an API request is received to a time of a response may be employed and, for example, is calculated in the following manner.

GET-server: 12:00:00.000 received
GET-server: 12:00:00.800 returned
Request processing time: 0.8 seconds Then, the processor calculates a maintenance standby time for the node (=VM 102) which is currently chosen (S318). The maintenance standby time may be calculated in the following manner, for example, using the number of requests acquired for each request type in S316 and an average processing time for each request type acquired in S317.

$$\text{Maintenance standby time} = \Sigma(\text{average processing time for each request type} \times \text{the number of requests})$$

Σ in a right side represents a total sum for all of request types. The maintenance standby times are calculated for all candidate nodes for maintenance by repeating the series of processes from S316 to S318 (repetition of S315→S316→S317→S318→S319→S315).

When all of processes described above are completed (YES in S319), next, the processor included in the information processing device 101 illustrated in FIG. 1 executes a series of processes from S320 to S322.

The processor first chooses, as a maintenance target node, a node (=VM 102) in the node list acquired in S314, on which maintenance is not performed yet, and the maintenance standby time of which is the shortest among the maintenance standby times that have been calculated in S318 (S320).

Next, the processor executes maintenance processing for the node (=VM 102) chosen in S320 (S321).

Thereafter, the processor determines whether or not any candidate node on which maintenance is not performed yet remains (S322).

In a case where a candidate node on which maintenance is not performed yet remains (YES in S322), the processor returns the process to S320 and chooses a candidate node having the next shortest maintenance standby time to execute maintenance processing.

In a case where a candidate node on which maintenance is not performed yet does not remain (NO in S322), the processor terminates maintenance control processing illustrated in the flowcharts of FIG. 3 and FIG. 4.

In the above-described manner, according to the embodiment, it is possible to execute maintenance processing in order from a node (=VM 102) having a shorter maintenance standby time. Thus, according to the embodiment, an order of computers in which maintenance is performed may be determined so as not to cause a system down.

Figure 6:
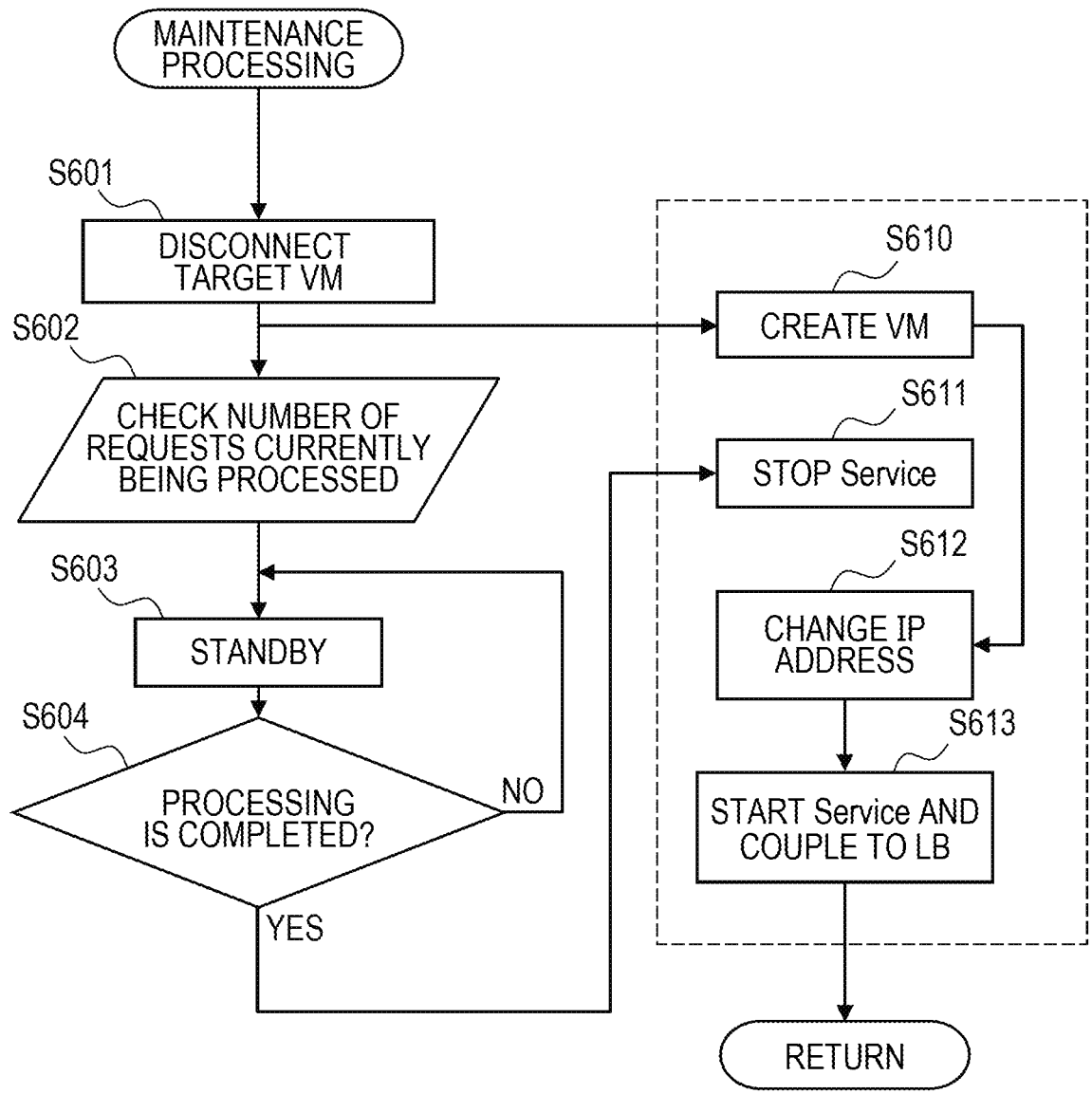
FIG. 6 is a flowchart illustrating an exemplary maintenance processing.

FIG. 6 is a flowchart illustrating an exemplary maintenance processing of S321 in FIG. 4.

The information processing device 101 illustrated in FIG. 1 first disconnects the maintenance target VM 102 in the LB 103 illustrated in FIG. 1 (S601). With this disconnection, the information processing device 101 performs creation of a new VM 102 (S610). For example, in FIG. 1, assuming that a VM 102 of #i is a maintenance target, the VM 102 (#i) is disconnected by the LB 103. Also, for example, the VM 102 of #j illustrated in FIG. 1 is newly created.

Next, the information processing device 101 checks the number of API requests that are being processed in the maintenance target VM 102 (S602). By this processing, for example, the following information is acquired.

GET-server: 20 requests
POST-server: 10 requests
DELETE-server: 5 requests

Next, after the maintenance target VM 102 is disconnected by the LB 103 in S601, the information processing device 101 stands by until processing of all of requests checked in S602 is completed (repetition processing of S603→S604→S603).

When the processing is completed (YES in S604), the information processing device 101 causes, for example, a service ("Service" in FIG. 6) by the VM 102 of #i illustrated in FIG. 1, which is being operated up to the current time, to be stopped (S611).

Next, the information processing device 101 changes, for example, an IP address ("IP(#j)" in FIG. 1) of VM 102 of #j illustrated in FIG. 1, which is newly created, to an IP address that is newly set (S612).

Then, the information processing device 101 starts up a service of the VM 102 (#j) which is newly created and causes the LB 103 illustrated in FIG. 1 to couple the VM 102 (#j) thereto (S613). Thereafter, the information processing device 101 terminates the maintenance processing of S321 in FIG. 4, which is illustrated in the flowchart of FIG. 6.

A maintenance method illustrated in the flowchart of FIG. 6 is a method in which a maintenance target VM 102 is newly created, but in a case where a VM 102 is not newly created, a method in which a service is stopped, a maintenance is performed, and the service is started up in the same VM 102 may be employed. In addition, for the VM 102, various maintenance methods may be employed.

A specific operation example of the maintenance control processing illustrated in the flowcharts of FIG. 3, FIG. 4, and FIG. 6 will be described below. In the description below, a case in which the VMs 102 illustrated in FIG. 1 are two VMs 102 of #1 and #2 and maintenance is performed on the VMs 102 of #1 and #2 will be described.

First, the number of requests is monitored (S301 in FIG. 3). For example, it is assumed that the current time is 9:00 and the number of requests in each hour on Thursday, May 11, 2017 is as follows.

0 o'clock to 1 o'clock: 30 API requests/hour
1 o'clock to 2 o'clock: 20 API requests/hour
2 o'clock to 3 o'clock: 50 API requests/hour
3 o'clock to 4 o'clock: 70 API requests/hour
4 o'clock to 5 o'clock: 60 API requests/hour
5 o'clock to 6 o'clock: 70 API requests/hour
6 o'clock to 7 o'clock: 70 API requests/hour
7 o'clock to 8 o'clock: 70 API requests/hour
8 o'clock to 9 o'clock: 180 API requests/hour Based on past data, average numbers of requests for one day of Thursday (not a public holiday) are as follows.

0 o'clock to 1 o'clock: 28 API requests/hour
1 o'clock to 2 o'clock: 18 API requests/hour
2 o'clock to 3 o'clock: 48 API requests/hour
3 o'clock to 4 o'clock: 68 API requests/hour
4 o'clock to 5 o'clock: 58 API requests/hour
5 o'clock to 6 o'clock: 68 API requests/hour
6 o'clock to 7 o'clock: 68 API requests/hour
7 o'clock to 8 o'clock: 68 API requests/hour
8 o'clock to 9 o'clock: 178 API requests/hour
9 o'clock to 10 o'clock: 250 API requests/hour
10 o'clock to 11 o'clock: 280 API requests/hour
11 o'clock to 12 o'clock: 200 API requests/hour
12 o'clock to 13 o'clock: 180 API requests/hour
13 o'clock to 14 o'clock: 290 API requests/hour
14 o'clock to 15 o'clock: 310 API requests/hour
15 o'clock to 16 o'clock: 300 API requests/hour
16 o'clock to 17 o'clock: 250 API requests/hour
17 o'clock to 18 o'clock: 200 API requests/hour
18 o'clock to 19 o'clock: 180 API requests/hour
19 o'clock to 20 o'clock: 165 API requests/hour
20 o'clock to 21 o'clock: 130 API requests/hour
21 o'clock to 22 o'clock: 80 API requests/hour
22 o'clock to 23 o'clock: 50 API requests/hour
23 o'clock to 24 o'clock: 30 API requests/hour With reference to the above, because the number of requests is the smallest at 23 o'clock, 23 o'clock may be the preferred timing (S302 in FIG. 3).

Looking at 0 o'clock to 9 o'clock, the numbers of API requests for the current day are considered to follow the past request trend and are slightly larger than the average values (S303→S304→S305 in FIG. 3). In order to determine whether or not the current request trend is a peculiar trend, a standard deviation of differences between the number of current requests and an average value of the number of past requests in each time period is calculated. Each current value is past value+2 in this example, and therefore, the standard deviation of the differences is 0. The closer to 0 the standard deviation is, the closer to the past request trend the current request trend is. A threshold used for determining whether or not the current request trend is a peculiar trend is, for example, an average of the average numbers of requests in the respective time periods for one day in the past. In a case where the standard deviation of the differences between the number of current requests and the average value of the number of past requests in each time period is larger than the average of the average numbers of requests, the current request trend is determined to be a peculiar trend. In a case where the current request trend follows the past request trend, whether the numbers of current requests are smaller or larger than the numbers of past requests is determined using an average of the numbers of the requests. For example, in a case where the number of API requests for the current day is larger than the number of past API requests in each hour by 100, the numbers of current requests are larger than the numbers of past requests. In this case, the standard deviation is 0 and the current request trend follows the past request trend.

Assuming that the upper limit value of service guarantee is 300 requests per hour. Processing performance is reduced to ½ when maintenance is performed, and therefore, the upper limit value of service guarantee is to be set not to exceed 150 requests per hour. Furthermore, considering that the number of requests is larger than the number in a normal case by 100, in a case where maintenance is performed in a time period having the average value in the past of 50 or more, the upper limit value of service guarantee may be exceeded. In this example, time periods other than the time period of 23 o'clock to 24 o'clock correspond to such a time period. In that case, determination on whether or not maintenance is to be postponed until the following day or after is left to the administrator (S306 in FIG. 3).

In any case where it is determined to perform maintenance, standby is held until 23 o'clock (repetition processing of S309→S310→S309 in FIG. 3).

API requests that are being processed by each node at 23 o'clock are checked and the maintenance standby time is calculated (S316 to S318 in FIG. 4). In a case where the maintenance standby time is simply calculated from the number of API requests and the past average values, for example, the following results are obtained.

VM 102 (#1): Total 3350 seconds
  GET-server: Average 1 second×the number of requests 100=100 seconds
  POST-server: Average 60 seconds×the number of requests 50=3000 seconds
  DELETE-server: Average 5 seconds×the number of requests 50=250 seconds
VM 102 (#2): Total 2150 seconds
  GET-server: Average 1 second×the number of requests 100=100 seconds
  POST-server: Average 60 seconds×the number of requests 30=1800 seconds
  DELETE-server: Average 5 seconds×the number of requests 50=250 seconds Based on the above-described results, maintenance is started with the VM 102 (#2).

However, in a case where calculation is performed using a current processing time for each VM 102, not the average value, the following results are obtained.

VM 102 (#1): Total 3350 seconds
  GET-server: Average 1 second×the number of requests 100=100 seconds
  POST-server: Average 60 seconds×the number of requests 50=3000 seconds
  DELETE-server: Average 5 seconds×the number of requests 50=250 seconds
VM 102 (#2): Total 6450 seconds
  GET-server: Average 3 seconds×the number of requests 100=300 seconds
  POST-server: Average 180 seconds×the number of requests 30=5400 seconds
  DELETE-server: Average 15 seconds×the number of requests 50=750 seconds In this case, maintenance is stared with the VM 102 (#1). After the disconnection by LB 103 (FIG. 1), no calculation is performed. Because the two VMs 102 of #1 and #2 are targets in this case, after maintenance of the VM 102 of #1 is completed, the VM 102 of #2 is automatically chosen.

FIG. 7 is a diagram illustrating an exemplary hardware configuration of a computer that is able to implement the information processing device 101 illustrated in FIG. 1 or the server devices 104 that execute the VMs 102.

The computer illustrated in FIG. 7 includes the CPU 701, a memory 702, an input device 703, an output device 704, an auxiliary storage device 705, a medium drive device 706 in which a portable recording medium 709 is inserted, and a network connection device 707. These components are coupled to one another via a bus 708. A configuration illustrated in FIG. 7 is an example of a computer that is able to implement the above-described information processing device 101 and the computer is not limited to this configuration.

The memory 702 is a semiconductor memory, such as, for example, a read-only memory (ROM), a random access memory (RAM), a flash memory, or the like, and stores a program and data that are used for processing.

The CPU (processor) 701 executes a program, for example, using the memory 702, and thereby, operates, for example, as a processor of the server device 104 illustrated in FIG. 1. In a case where the CPU 701 is the processor of the server device 104, the CPU 701 executes a program using the memory 702, and thereby, causes the corresponding VMs 102 to operate.

The input device 703 is, for example, a keyboard, a pointing device, or the like, and is used for inputting an instruction or information from an operator or the user. The output device 704 is, for example, a display device, a printer, a speaker, or the like, and is used for outputting an inquiry to the operator or the user (S306, S308, S312, or the like in FIG. 3) or a processing result.

The auxiliary storage device 705 is, for example, a hard disk storage device, a magnetic disk storage device, an optical disk device, a magneto-optical disk device, a tape device, or a semiconductor storage device. The information processing device 101 illustrated in FIG. 1 is able to store a program or data in the auxiliary storage device 705 in advance, load the program or the data to the memory 702, and thus, use the program or the data.

The medium drive device 706 drives the portable recording medium 709 and accesses recorded contents thereof. The portable recording medium 709 is a memory device, a flexible disk, an optical disk, a magneto-optical disk, or the like. The portable recording medium 709 may be a compact disk read-only memory (CD-ROM), a digital versatile disk (DVD), a universal serial bus (USB) memory, or the like. The operator or the user is able to store a program or a data in the portable recording medium 709 in advance, load the program or the data in the memory 702, and thus, use the program and the data.

As described above, a computer-readable recording medium that stores a program or data used for processing of the information processing device 101 illustrated in FIG. 1 or processing of the server device 104 that executes the VMs 102 illustrated in FIG. 1 is a physical (non-transitory) recording medium, such as the memory 702, the auxiliary storage device 705, or the portable recording medium 709.

The network connection device 707 is a communication interface that is coupled to a communication network, such as, for example, a local area network (LAN) or the like, and performs data conversion that is performed along with a communication. The information processing device 101 illustrated in FIG. 1 and the server device 104 illustrated in FIG. 1 are able to receive a program or data from an external device via the network connection device 707, load the program or the data to the memory 702, and use the program or the data.

Note that there may be a case in which the information processing device 101 illustrated in FIG. 1 or the server device illustrated in FIG. 1 does not include all of the components illustrated in FIG. 7, and some of the components may be omitted in accordance with use and conditions. For example, in a case where the portable recording medium 709 is not used, the medium drive device 706 may be omitted.

In the above-described described, there may be a case in which a maintenance target is not a virtual machine (VM), and a maintenance target may be a computer, such as a physical server device or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing device, comprising:
a memory; and
a processor coupled to the memory and the processor configured to:
record, in the memory, requests to a plurality of computers;
determine, based on a past number of requests in a predetermined time and a specified maintenance-performing time, a time period in which maintenance is to be performed;
stand by until the determined time period comes;
determine, after standby, a maintenance standby time for each of the plurality of computers based on requests assigned to each of the plurality of computers, the maintenance standby time being a time between when a maintenance start instruction is issued to a time when the maintenance is started, the maintenance standby time determined by summing multiplication products of an average processing time for each of the requests multiplied by a number of the requests; and
determine, based on the maintenance standby time determined for each of the plurality of computers, an order in which maintenance is performed on the plurality of computers.

2. The information processing device according to claim 1, wherein the processor is configured to determine the maintenance standby time for each of the plurality of computers based on request types of the assigned requests, numbers of assigned requests of the respective request types, and a request processing performance of each of the plurality of computers.

3. The information processing device according to claim 1, wherein the processor is configured to determine the time period based on at least an upper limit value of service guarantee in a case where the upper limit value of service guarantee is set for the plurality of computers.

4. The information processing device according to claim 1, wherein the processor is configured to:
give a warning to a user in consideration of an upper limit value of service guarantee in a case where the upper limit value of service guarantee is set for the plurality of computers and in a case where a current number of requests follows the past number of requests and a number of current requests is larger than the past number of requests; and
allow the user to choose whether to perform or postpone maintenance; and
stand by until the determined time period comes in a case where the user chooses to perform maintenance.

5. The information processing device according to claim 1, wherein the processor is configured to:
allow a user to choose whether or not to immediately perform maintenance in a case where a current number of requests follows the past number of requests and a number of current requests is smaller than the past number of requests;
start maintenance without performing the standby in a case where the user chooses to immediately perform maintenance; and
stand by until the determined time period comes in a case where the user chooses not to immediately perform maintenance.

6. The information processing device according to claim 1, wherein the processor is configured to:
stand by until the determined time period comes in a case where a current number of requests follows the past number of requests and a number of current requests is average with respect to the past number of requests.

7. The information processing device according to claim 1, wherein the processor is configured to:
give, in a case where a current number of requests does not follow the past number of requests, a warning to a user to allow the user to choose whether to perform or postpone maintenance; and
start maintenance without performing the standby in a case where the user chooses to perform maintenance.

8. The information processing device according to claim 1, wherein the processor is configured to: determine the order such that maintenance is performed on the plurality of computers in ascending order of the maintenance standby time determined for each of the plurality of computers.

9. An information processing system, comprising:
a plurality of computers; and
an information processing device including:
a memory; and
a processor coupled to the memory and the processor configured to:
record, in the memory, requests to the plurality of computers;
determine, based on a past trend of requests and a specified maintenance-performing time, a time period in which maintenance is to be performed;
stand by until the determined time period comes;
determine, after standby, a maintenance standby time for each of the plurality of computers based on requests assigned to each of the plurality of computers, the maintenance standby time being a time between when a maintenance start instruction is issued to a time when the maintenance is started, the maintenance standby time determined by summing multiplication products of an average processing time for each of the requests multiplied by a number of the requests;
determine, based on the maintenance standby time determined for each of the plurality of computers, an order in which maintenance is performed on the plurality of computers; and
determine an order of maintenance such that maintenance is performed on the plurality of computers in ascending order of the maintenance standby time determined for each of the plurality of computers.

10. A non-transitory computer-readable recording medium having stored therein a program that causes a computer to execute a process, the process comprising:
recording, in a memory, requests to a plurality of computers;
determining, based on a past trend of requests and a specified maintenance-performing time, a time period in which maintenance is to be performed;
standing by until the determined time period comes;
determining, after standby, a maintenance standby time for each of the plurality of computers based on requests assigned to each of the plurality of computers, the maintenance standby time being a time between when a maintenance start instruction is issued to a time when the maintenance is started, the maintenance standby time determined by summing multiplication products of an average processing time for each of the requests multiplied by a number of the requests; and
determining an order of maintenance such that maintenance is performed on the plurality of computers in ascending order of the maintenance standby time determined for each of the plurality of computers.

* * * * *